United States Patent
Yamaji et al.

(10) Patent No.: US 11,449,975 B2
(45) Date of Patent: Sep. 20, 2022

(54) OBJECT COUNT ESTIMATION APPARATUS, OBJECT COUNT ESTIMATION METHOD, AND COMPUTER PROGRAM PRODUCT

(71) Applicant: KABUSHIKI KAISHA TOSHIBA, Minato-ku (JP)

(72) Inventors: Yuto Yamaji, Kawasaki (JP); Tomoyuki Shibata, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 338 days.

(21) Appl. No.: 16/803,402

(22) Filed: Feb. 27, 2020

(65) Prior Publication Data
US 2021/0065351 A1 Mar. 4, 2021

(30) Foreign Application Priority Data
Sep. 4, 2019 (JP) .............................. JP2019-161610

(51) Int. Cl.
*G06T 7/00* (2017.01)
*G06F 17/18* (2006.01)
*G06N 3/08* (2006.01)
*G06N 20/00* (2019.01)

(52) U.S. Cl.
CPC ............ *G06T 7/0002* (2013.01); *G06F 17/18* (2013.01); *G06N 3/08* (2013.01); *G06N 20/00* (2019.01);
(Continued)

(58) Field of Classification Search
CPC ...... G06F 17/18; G06K 9/6274; G06N 20/00; G06N 3/0454; G06N 3/08;
(Continued)

(56) References Cited

U.S. PATENT DOCUMENTS

2016/0358027 A1* 12/2016 Hotta ..................... G06V 20/54
2019/0392270 A1* 12/2019 Pham ................... G06K 9/6288
(Continued)

FOREIGN PATENT DOCUMENTS

JP  2015-167854 A  9/2015
JP  2017-59207 A  3/2017
(Continued)

OTHER PUBLICATIONS

Shami, Mamoona Birkhez, et al. "People counting in dense crowd images using sparse head detections." IEEE Transactions on Circuits and Systems for Video Technology 29.9 (2018): 2627-2636. (Year: 2018).*
(Continued)

*Primary Examiner* — Bobbak Safaipour
(74) *Attorney, Agent, or Firm* — Oblon, McClelland, Maier & Neustadt, L.L.P.

(57) ABSTRACT

An object count estimation apparatus according to an embodiment of the present disclosure includes a memory and one or more hardware processors coupled to the memory. The one or more hardware processors are configured to: obtain an image; set, based on the image, a local area size representing a unit of object count estimation in the image; and estimate an object count in the image for each local area having the set local area size.

8 Claims, 11 Drawing Sheets

(52) U.S. Cl.
CPC ............... *G06T 2207/20081* (2013.01); *G06T 2207/20084* (2013.01); *G06T 2207/30242* (2013.01)

(58) Field of Classification Search
CPC . G06T 2207/20076; G06T 2207/20081; G06T 2207/20084; G06T 2207/20104; G06T 2207/30196; G06T 2207/30232; G06T 2207/30242; G06T 7/0002; G06T 7/77; G06V 10/454; G06V 10/82; G06V 20/53
See application file for complete search history.

(56) References Cited

U.S. PATENT DOCUMENTS

| | | | | |
|---|---|---|---|---|
| 2020/0050873 | A1* | 2/2020 | Ikeda | G08B 13/19673 |
| 2020/0311440 | A1* | 10/2020 | Bamba | G06V 10/75 |
| 2021/0092319 | A1* | 3/2021 | Honjo | H04N 1/2158 |

FOREIGN PATENT DOCUMENTS

| | | |
|---|---|---|
| JP | 2018-22340 A | 2/2018 |
| JP | 2018-148367 A | 9/2018 |
| JP | 2018-180619 A | 11/2018 |
| WO | WO 2018/173108 A1 | 9/2018 |
| WO | WO 2018/216648 A1 | 11/2018 |

OTHER PUBLICATIONS

Marsden, Mark, et al. "Fully convolutional crowd counting on highly congested scenes." arXiv preprint arXiv:1612.00220 (2016). (Year: 2016).*

Saqib, Muhammad, et al. "Crowd counting in low-resolution crowded scenes using region-based deep convolutional neural networks." IEEE Access 7 (2019): 35317-35329. (Year: 2019).*

* cited by examiner

OBJECT COUNT ESTIMATION APPARATUS, OBJECT COUNT ESTIMATION METHOD, AND COMPUTER PROGRAM PRODUCT

CROSS-REFERENCE TO RELATED APPLICATIONS

This application is based upon and claims the benefit of priority from Japanese Patent Application No. 2019-161610, filed on Sep. 4, 2019; the entire contents of which are incorporated herein by reference.

FIELD

Embodiments described herein relate generally to an object count estimation apparatus, an object count estimation method, and a computer program product.

BACKGROUND

A technology has been known, in which an image obtained from a monitoring camera or the like is analyzed and a count of persons appearing in the image is estimated. For example, a technology has been disclosed, in which a learning model is learnt using teacher data that represents a correspondence between an image and correct labels representing the crowd states and the crowd positions of the crowd appearing in the image, and then the crowd positions are estimated from the image by using the learning model. Conventionally, by estimating objects appearing in an image for each fixed-size area, the count of objects is estimated based on the crowd positions.

DETAILED DESCRIPTION

According to an embodiment of the present disclosure, an object count estimation apparatus includes a memory and one or more hardware processors coupled to the memory. The one or more hardware processors are configured to: obtain an image; set, based on the image, a local area size representing a unit of object count estimation in the image; and estimate an object count in the image for each local area having the set local area size.

Exemplary embodiments of an object count estimation apparatus, an object count estimation method, and a computer program product are described below in detail with reference to the accompanying drawings.

First Embodiment

Figure 1:
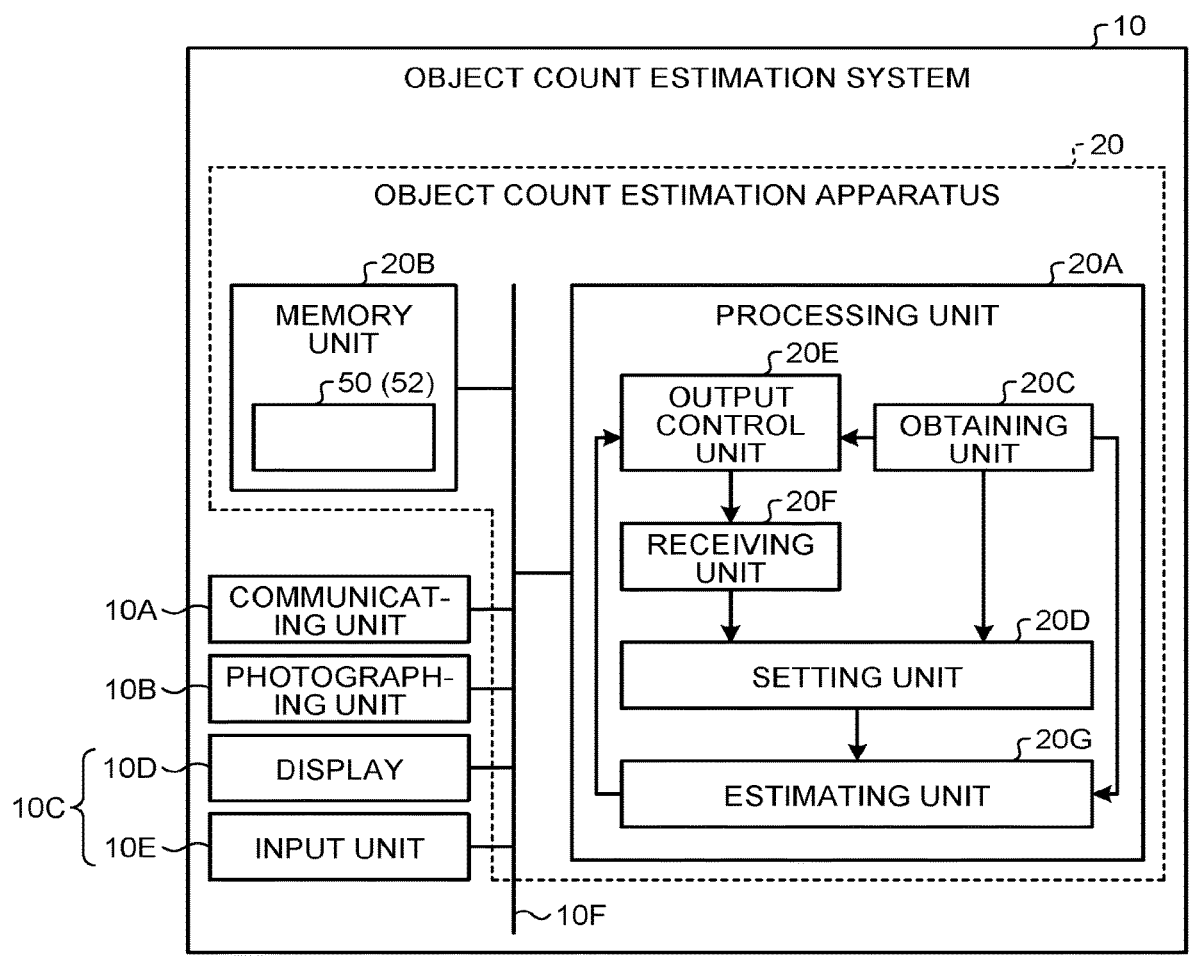
FIG. 1 is a schematic diagram illustrating an object count estimation system according to a first embodiment.

FIG. 1 is a schematic diagram illustrating an example of an object count estimation system 10 according to a first embodiment.

The object count estimation system 10 includes an object count estimation apparatus 20, a communicating unit 10A, a photographing unit 10B, and a user interface (UI) unit 10C.

The object count estimation apparatus 20 is connected to the communicating unit 10A, the photographing unit 10B, and the UI unit 10C in a manner enabling transmission and reception of data and signals.

The object count estimation apparatus 20 is, for example, a dedicated computer or a general-purpose computer. The object count estimation apparatus 20 estimates a count of objects appearing in an image (details are given later).

The communicating unit 10A communicates with external devices. For example, the communicating unit 10A sends a variety of information to external devices and receives a variety of information from external devices via a known type of communication line.

The photographing unit 10B is a photographing device that captures objects. The photographing unit 10B obtains image data of captured images by photography. In the following explanation, the image data is sometimes simply referred to as images.

The photographing unit 10B obtains captured images of a target area. The target area represents a specific area in the real space. The target area can be set in advance. For example, an area inside a specific building, a specific region, or a specific space may be the target area.

The photographing unit 10B obtains such captured images in which the objects present in the target area appear.

Herein, the object refers to a target of a count to be estimated by the object count estimation apparatus 20. The type of each object can be set in advance. Examples of the objects include persons, animals, cells, various organisms, flyable objects (manned airplanes or unmanned airplanes (for example, unmanned aerial vehicles (UAVs) or drones), and robots. Although the objects are not limited to these examples, the explanation is given in the first embodiment on the assumption that the objects are persons.

The UI unit 10C is provided with the function of receiving operation input from the user and the function of outputting a variety of information. The UI unit 10C includes a display 10D and an input unit 10E.

The display 10D displays a variety of information. Examples of the display 10D include a known organic electro-luminescence (EL) display, a liquid crystal display (LCD), and a projector display.

The input unit 10E receives various instructions from the user. Examples of the input unit 10E include a keyboard, a mouse, a touch-sensitive panel, and a microphone.

Alternatively, the UI unit 10C can be configured by a touch-sensitive panel including an input mechanism and an output mechanism. Moreover, the UI unit 10C can be configured to further include a speaker for outputting sounds.

Given below is the explanation of the object count estimation apparatus 20. The object count estimation apparatus 20 includes a processing unit 20A and a memory unit 20B. The processing unit 20A, the memory unit 20B, the communicating unit 10A, the photographing unit 10B, the display 10D, and the input unit 10E are connected to each other via a bus 10F.

Alternatively, at least one of the memory unit 20B, the photographing unit 10B, the display 10D, and the input unit 10E can be connected to the processing unit 20A over a network.

The memory unit 20B is used to store a variety of data. In the first embodiment, the memory unit 20B is used to store, in advance, a reference learning model 50. The reference learning model 50 is rebuilt into a learning model 52 as a result of the operations performed by the processing unit 20A. With regard to the reference learning model 50 and the learning model 52, the details are given later.

The memory unit 20B can be, for example, a semiconductor memory device such as a random access memory (RAM) or a flash memory, a hard disk, or an optical disk. Alternatively, the memory unit 20B can be a memory device installed on the outside of the object count estimation apparatus 20. Still alternatively, the memory unit 20B can be a memory medium. More specifically, in the memory medium, computer programs or a variety of information can be downloaded and stored or temporarily stored via a local area network (LAN) or the Internet. Still alternatively, the memory unit 20B can be configured using a plurality of memory mediums.

At least either the memory unit 20B or the processing unit 20A can be installed in an external device such as a server device connected to a network. Moreover, at least one of the functional units (described later) of the processing unit 20A can be installed in an external device such as a server device that is connected to the processing unit 20A over a network.

The processing unit 20A includes an obtaining unit 20C, a setting unit 20D, an output control unit 20E, a receiving unit 20F, and an estimating unit 20G. At least one of the obtaining unit 20C, the setting unit 20D, the output control unit 20E, the receiving unit 20F, and the estimating unit 20G is implemented by using, for example, one or more hardware processors. For example, the above-mentioned constituent elements can be implemented by making a hardware processor such as a central processing unit (CPU) execute computer programs, that is, can be implemented by using software. Alternatively, the above-mentioned constituent elements can be implemented using a hardware processor such as a dedicated integrated circuit (IC), that is, can be implemented by using hardware. Still alternatively, the above-mentioned constituent elements can be implemented by using a combination of software and hardware. In the case of using a plurality of hardware processors, each processor can be configured to implement one of the constituent elements or can be configured to implement two or more constituent elements.

The obtaining unit 20C obtains images. Herein, the obtaining unit 20C obtains target images for performing the object count estimation.

Figure 2A:
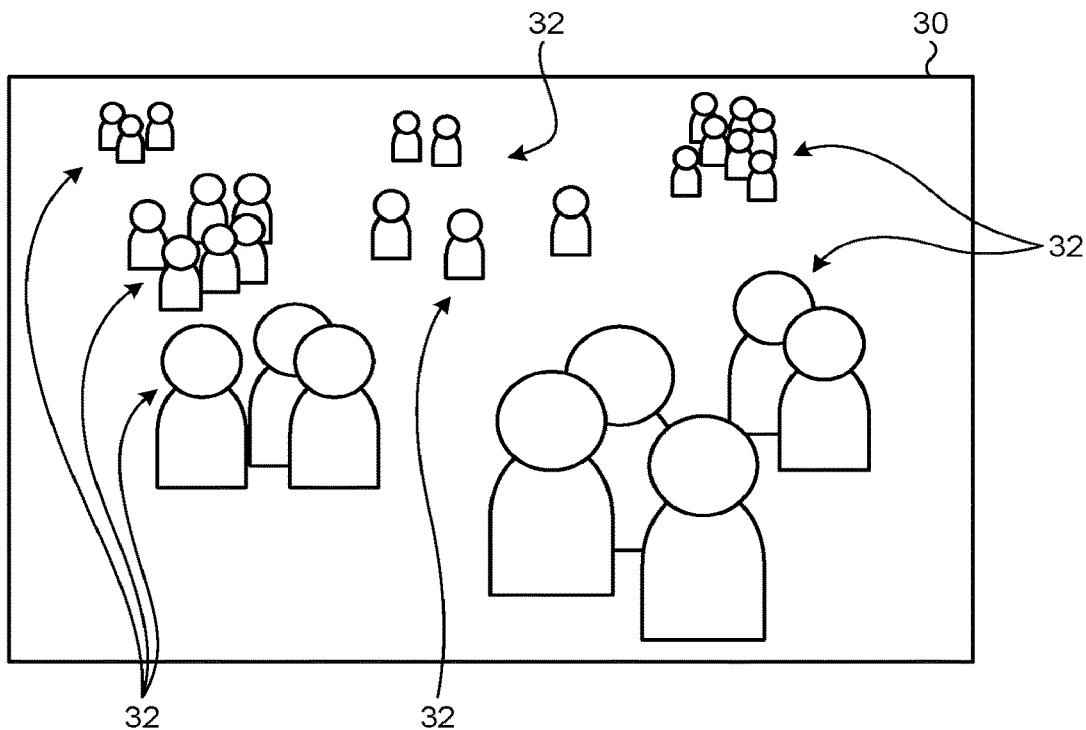
FIG. 2A is a schematic diagram illustrating an image according to the first embodiment.

FIG. 2A is a schematic diagram illustrating an exemplary image 30 obtained by the obtaining unit 20C. In the image 30, one or more persons 32 are captured. As described earlier, the persons 32 represent an example of objects.

The image 30 can be a captured image obtained by the photographing unit 10B, or can be an image obtained from an external device connected via the communicating unit 10A, or can be an image stored in advance in the memory unit 20B. The external device connected via the communicating unit 10A can be a photographing device connected via the communicating unit 10A. As long as that photographing device is capable of obtaining image data of the captured image, it serves the purpose. Herein, the image 30 is not limited to be a captured image. For example, the image 30 can be a captured image, or an image read by a scanner, or an image created using a known image creation application.

Returning to the explanation with reference to FIG. 1, the setting unit 20D sets a local area size in the image 30 based on the image 30 obtained by the obtaining unit 20C. The local area size represents a unit of object count estimation in the image 30.

Figure 2B:
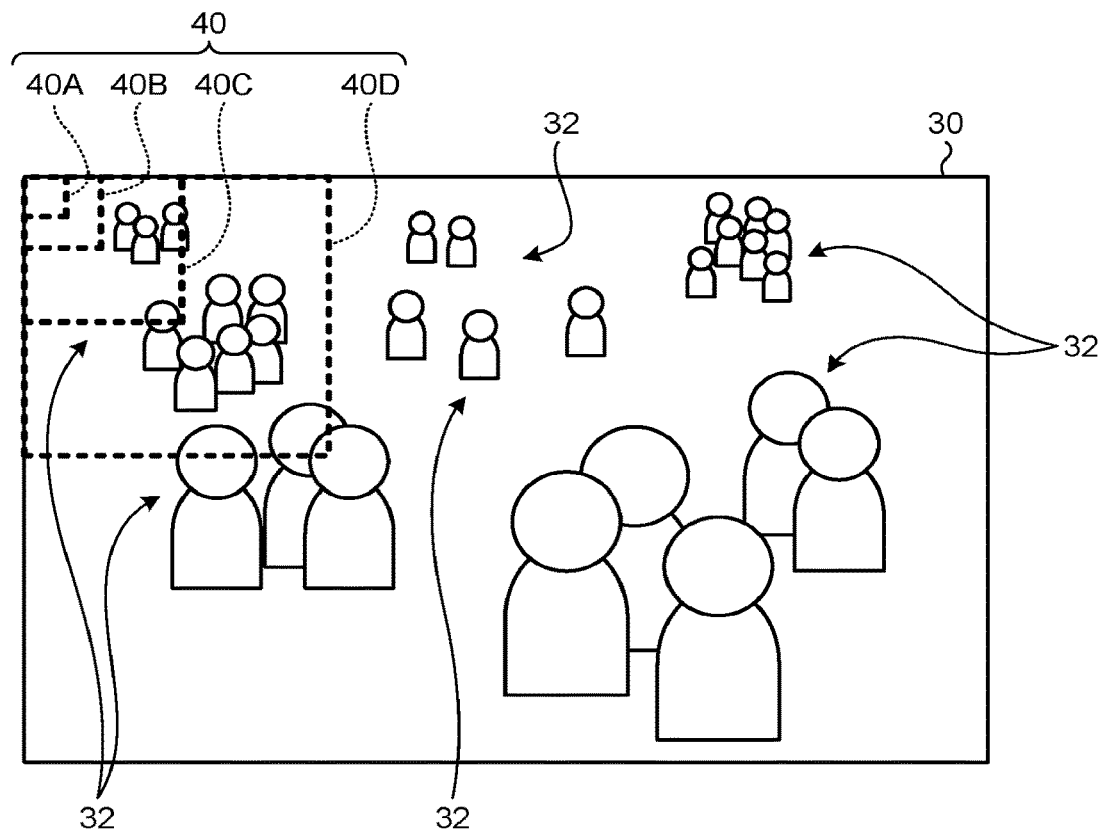
FIG. 2B is an explanatory diagram of local areas according to the first embodiment.

FIG. 2B is an explanatory diagram of exemplary local areas 40. In FIG. 2B, a plurality of local areas 40 (a local area 40A to a local area 40D) having different local area sizes are illustrated. For example, the local area 40A is the local area 40 having the local area size of 8×8 pixels. Similarly, for example, the local area 40B is the local area 40 having the local area size of 16×16 pixels. Moreover, for example, the local area 40C is the local area 40 having the local area size of 32×32 pixels. Furthermore, for example, the local area 40D is the local area 40 having the local area size of 64×64 pixels. The local area sizes are not limited to the example illustrated in FIG. 2B.

For example, the setting unit 20D derives, by using a known type of detector, the sizes of the head regions of the persons captured in the image 30. Then, the setting unit 20D can (automatically) set the local area sizes from the derived sizes of the head regions.

The estimating unit 20G (described later in detail) estimates the count of persons 32 in each local area 40 having a local area size in the image 30. As a result of performing the estimation for each local area 40, the estimating unit 20G estimates the count of persons 32 included in the image 30. In the following explanation, the count of persons 32 is sometimes referred to as the count of objects or the object count.

In order to estimate the count of objects, the reference learning model 50 is used. In the first embodiment, it is assumed that the reference learning model 50 is stored in advance in the memory unit 20B.

Figure 3:
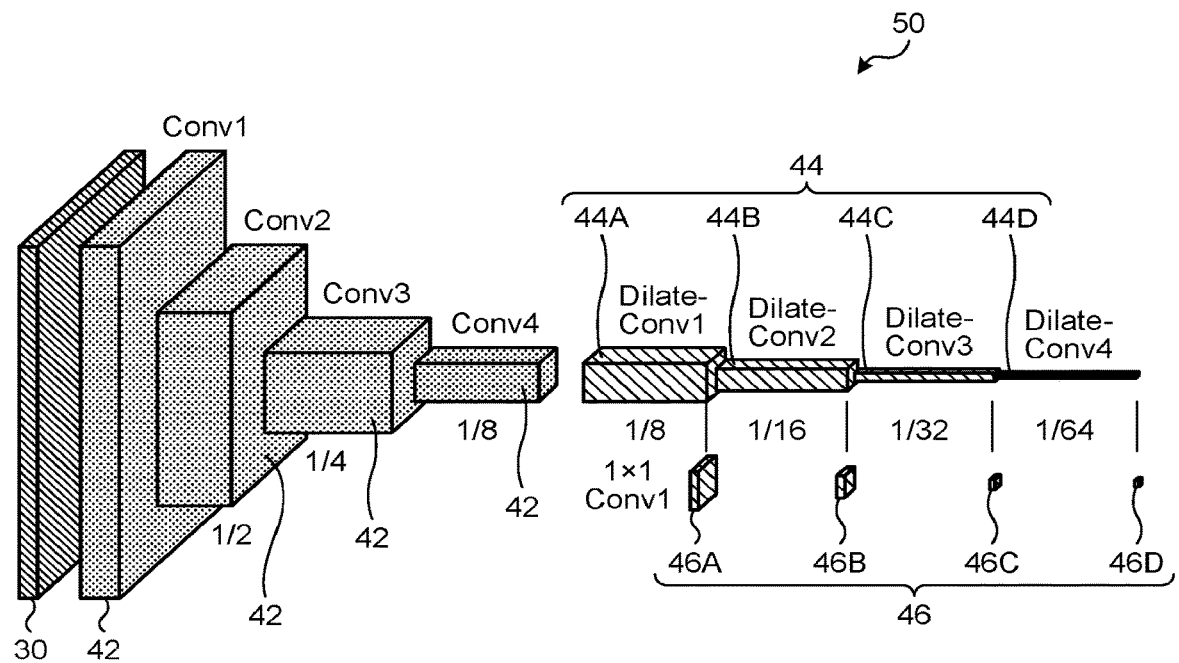
FIG. 3 is a schematic diagram illustrating a reference learning model according to the first embodiment.

FIG. 3 is a schematic diagram illustrating the reference learning model 50. The reference learning model 50 is a model for deriving the estimation results about the count of objects in the local areas 40 having local area sizes in the image 30 by repeatedly performing a convolution operation with respect to the image 30. The reference learning model 50 is a model of a neural network.

In the reference learning model 50, a convolution operation is repeatedly performed on the image 30, which is input as the input layer, to generate a plurality of convolution layers 42, and thereby a plurality of feature maps 44 having different sizes (resolutions and scales) is generated. Then, in the reference learning model 50, estimation results 46 are output, which represent a plurality of output maps (output layers) corresponding to the feature maps 44. The estimation results 46 represent the estimation results about the object count.

In FIG. 3, feature maps 44A to 44D are illustrated as examples of the feature maps 44.

The feature map 44A is the feature map 44 having the size reduced to one-eighth of the size. An estimation result 46A represents the estimation result about the count of objects derived from the feature map 44A having that reduced size. That is, the estimation result 46A is equivalent to the estimation result obtained by estimating the count of objects in the local area 40A having the local area size of 8×8 pixels.

The feature map 44B is the feature map 44 having the size reduced to 1/16-th of the size. An estimation result 46B represents the estimation result about the count of objects derived from the feature map 44B having that reduced size. That is, the estimation result 46B is equivalent to the estimation result obtained by estimating the count of objects in the local area 40B having the local area size of 16×16 pixels.

The feature map 44C is the feature map 44 having the size reduced to 1/32-nd of the size. An estimation result 46C represents the estimation result about the count of objects derived from the feature map 44C having that reduced size. That is, the estimation result 46C is equivalent to the estimation result obtained by estimating the count of objects in the local area 40C having the local area size of 32×32 pixels.

The feature map 44D is the feature map 44 having the size reduced to 1/64-th of the size. An estimation result 46D represents the estimation result about the count of objects derived from the feature map 44D having that reduced size. That is, the estimation result 46D is equivalent to the estimation result obtained by estimating the count of objects in the local area 40D having the local area size of 64×64 pixels.

Figure 4:
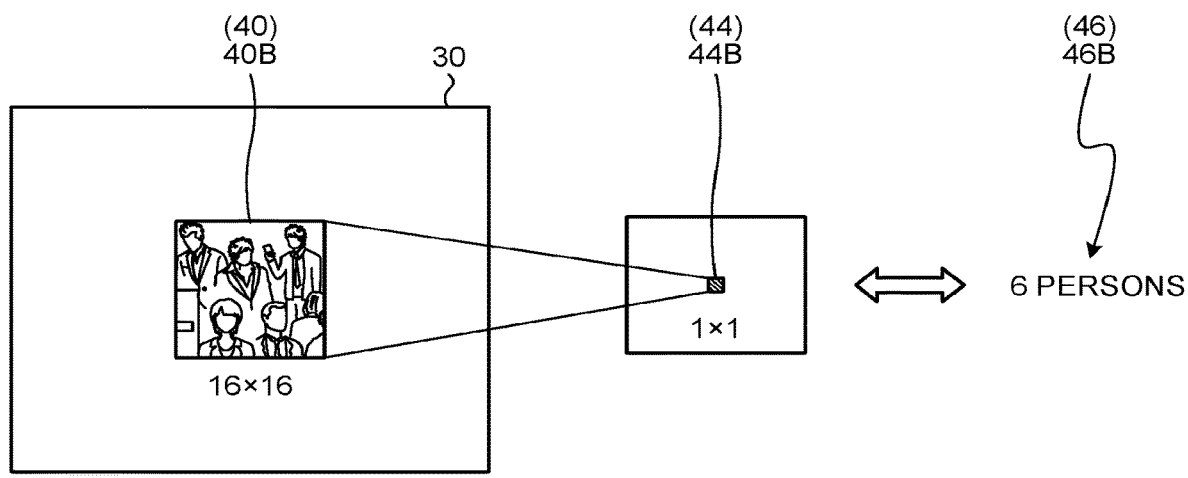
FIG. 4 is a schematic diagram illustrating the relationship between a local area size, a feature map, and an estimation result according to the first embodiment.

FIG. 4 is a schematic diagram illustrating an example of the relationship between the local area size of the local area 40B of the image 30, the feature map 44, and the estimation result 46. In FIG. 4, an example is illustrated, in which the local area size is 16×16 pixels.

As illustrated in FIG. 4, it is assumed that the object count is estimated in the local area 40B having the local area size of 16×16 pixels in the image 30. In this case, the image is reduced to 1/16-th of the size by using the reference learning model 50, and the feature map 44B corresponding to the local area 40B is obtained. Then, from the feature map 44B, the estimation result 46B is obtained that represents six persons, for example.

Meanwhile, when the scope of the target area appearing in the image 30 is changed, the size of the persons 32 captured in the image 30 also changes.

The change in the scope of the target area means that the photographing range is changed in a case where a captured image is used as the target image 30 for object count estimation. That is, the change in the scope of the target area refers to a change in at least one of the following factors of either the photographing unit 10B that captures the image or some other photographing device that captures the image 30: the height of the installation position from the ground, the photographing angle; the angle of view; the reproduction ratio; the resolution; and the photographing environment (such as brightness) When an image other than a captured image is used as the image 30, the change in the scope of the target area may mean that there is a change in the sizes of the objects appearing in the image 30.

When the local area size of the local area 40 representing a unit of object count estimation is fixed regardless of the image 30, sometimes there is a decline in the object count estimation accuracy.

Figure 5A:
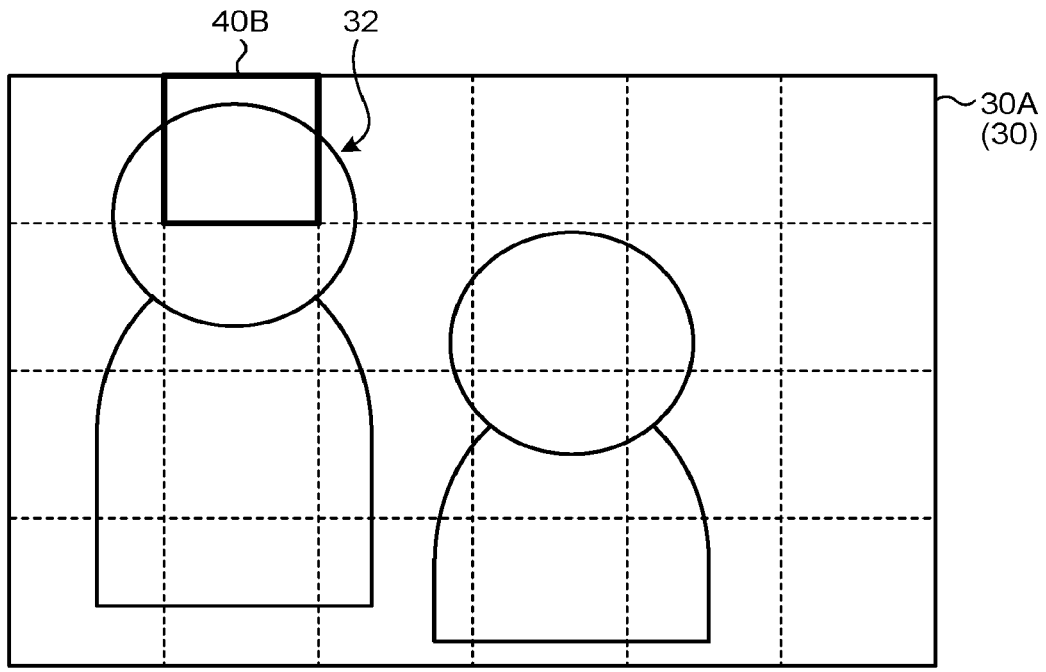
FIGS. 5A and 5B are schematic diagrams illustrating images according to the first embodiment.
Figure 5B:
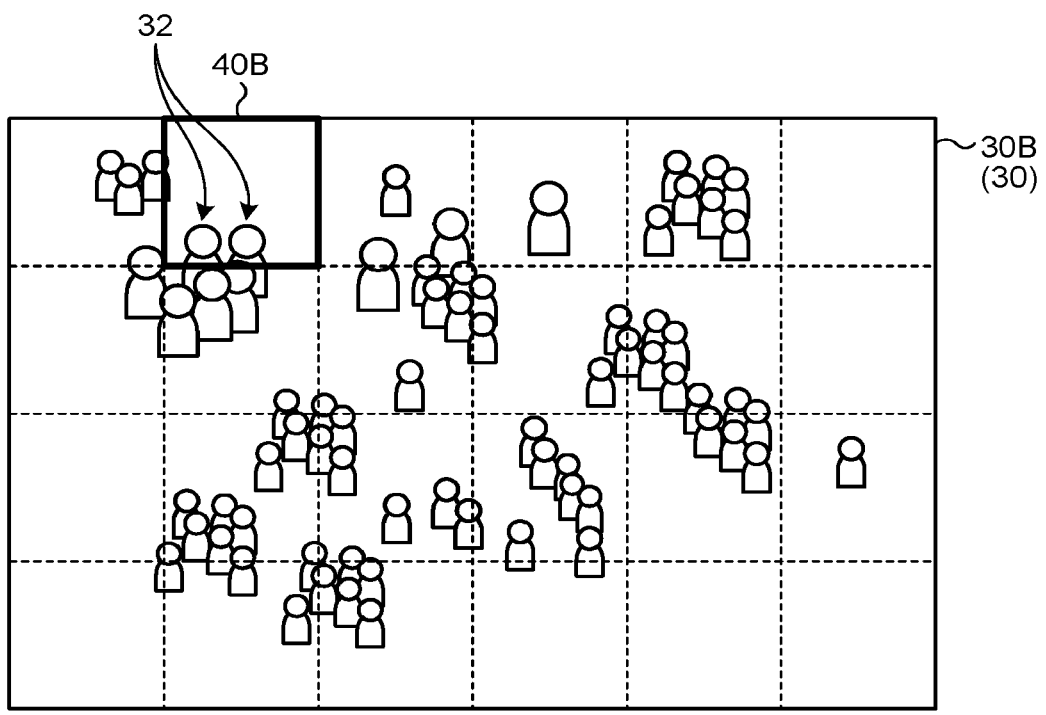

FIGS. 5A and 5B are schematic diagrams illustrating examples of the image 30 having different scopes of the target area appearing therein. Specifically, FIG. 5A is a schematic diagram illustrating an example of an image 30A having a narrower scope of the target area. FIG. 5B is a schematic diagram illustrating an example of an image 30B having a wider scope of the target area. The images 30A and 30B are examples of the image 30.

As illustrated in FIGS. 5A and 5B, it is assumed that the local area size is fixed, and that the local area 40 having the same local area size (for example, the local area 40B having the local area size of 16×16 pixels) is set in the images 30A and 30B. In this case, in the image 30B having the wider scope of the target area (see FIG. 5B), the local area 40B having the above-mentioned local area size includes the entire body region (for example, the head region) that enables identification of the persons 32. On the other hand, in the image 30A having the narrower scope of the target area (see FIG. 5A), the local area 40B having the above-mentioned local area size includes only part of the body region (for example, the head region) that enables identification of a person 32. Thus, when estimation of the persons 32 is carried out by fixing the local area size regardless of the image 30, there may be cases where the estimation accuracy for estimating the persons 32 undergoes a decline.

Returning to the explanation with reference to FIG. 1, in the first embodiment, the setting unit 20D sets the local area size based on the image 30.

For example, the setting unit 20D sets the local area size selected by the user. In this case, for example, the user selects the desired estimation result 46 from the output image displayed by the output control unit 20E to select the local area size.

More specifically, the output control unit 20E outputs an output image. For example, the output control unit 20E displays the output image on the display 10D. Alternatively, the output control unit 20E can output the output image to an external device connected via the communicating unit 10A. In the first embodiment, the explanation is given for an example in which the output control unit 20E displays the output image on the display 10D.

The output image includes a list of estimation results 46 obtained by performing estimation in a plurality of local areas 40 having mutually different local area sizes.

Figure 6:
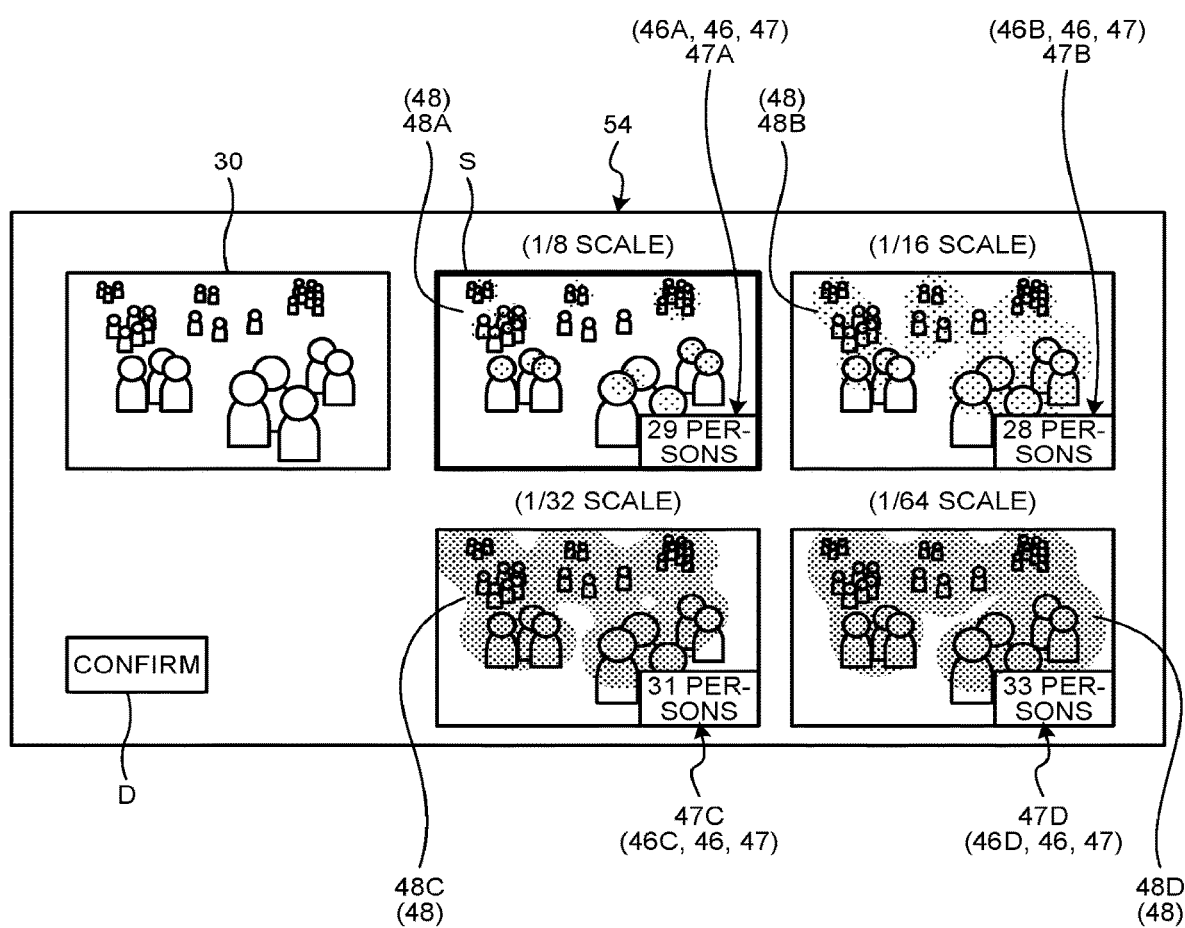
FIG. 6 is a schematic diagram illustrating output images according to the first embodiment.

FIG. 6 is a schematic diagram illustrating an example of an output image 54. The output image 54 includes the image 30 and a plurality of estimation results 46.

The estimation results 46 that are displayed in the output image 54 represent the information representing the count of objects (i.e., the count of persons 32) estimated in each of a plurality of local areas 40 having mutually different sizes. In FIG. 6, an example of estimation result images 48 (48A to 48D) of the estimation results 46 (46A to 46D) is illustrated. Moreover, in FIG. 6, an example is illustrated in which, instead of including the estimation result 46 corresponding to each local area 40, the estimation result image 48 includes object counts 47 (47A to 47D) of the objects appearing in the image 30. The object counts 47 (47A to 47D) represent the calculation results of calculating the object count in the entire image 30 by performing, with respect to the entire image 30, the operation of estimating the object count (the estimation result 46) for each local area 40 (40A to 40D) of the image 30 while varying the position of the local area 40.

It is desirable that each estimation result image 48 is a superimposed image formed by superimposing the information representing at least either the corresponding estimation result 46 or the corresponding object count 47 on the image 30.

In FIG. 6, the estimation result image 48A is an image representing the object count 47A that represents the count of objects appearing in the image 30 and that is estimated for each local area 40A having the local area size of 8×8 pixels. The estimation result image 48B is an image representing the object count 47B that represents the count of objects appearing in the image 30 and that is estimated for each local area 40B having the local area size of 16×16 pixels. The estimation result image 48C is an image representing the object count 47C that represents the count of objects appearing in the image 30 and that is estimated for each local area 40C having the local area size of 32×32 pixels. The estimation result image 48D is an image representing the object count 47D that represents the count of objects appearing in the image 30 and that is estimated for each local area 40D having the local area size of 64×64 pixels.

For example, the output control unit 20E inputs the image 30, which is obtained by the obtaining unit 20C, to the reference learning model 50 and generates a plurality of estimation result images 48 corresponding to a plurality of mutually-different local area sizes. Then, the output control unit 20E can display the output image 54, which includes the image 30 and a plurality of estimation result images 48, on the display 10D.

The user operates the input unit 10E while visually confirming the output image 54, and selects one of the estimation results 46 (or one of the object counts 47). That is, the user selects one of the estimation result images 48 being displayed, and thus selects one of the estimation results 46 (or one of the object counts 47). In FIG. 6, an example is illustrated, in which the estimation result image 48A is selected. Herein, as long as the user selects at least one estimation result image 48 from among a plurality of estimation result images 48 being displayed, it serves the purpose. Thus, the user can also select two or more estimation result images 48. The following explanation is given for the case in which a single estimation result image 48 is selected.

Subsequently, the user operates the input unit 10E and selects the display position of a "Confirm" button D included in the output image 54. As a result, the receiving unit 20F receives the user selection on the estimation result 46 included in the output image 54.

The setting unit 20D can set the local area size corresponding to the received estimation result 46 (or the object count 47) as the local area size representing a unit of object count estimation in the image 30.

The setting method for the local area size as performed by the setting unit 20D is not limited to the method described above.

Alternatively, for example, the setting unit 20D can set, as the local area size representing a unit of object count estimation in the image 30, the local area size used in deriving the closest estimation result 46, from among a plurality of estimation results 46, to the correct object count in the image 30 as obtained in advance.

In this case, it is desirable that the setting unit 20D uses the object counts 47 instead of using the estimation results 46. As described above, the object counts 47 represent the calculation results of calculating the object count in the entire image 30 by performing, with respect to the entire image 30, the operation of estimating the estimation result 46 for each of the local areas 40 of the image 30 while varying the position of the local area 40. Then, the setting unit 20D can set, as the local area size representing a unit of object count estimation in the image 30, the local area size used in estimating the closest object count to the obtained correct object count.

The setting unit 20D can receive, from the input unit 10E, the correct object count in the image 30 as obtained in advance. In this case, the correct object count included in the image 30 can be input by operating the input unit 10E. Alternatively, as the correct object count obtained in advance, the setting unit 20D can use the object count in the image 30 as estimated using an external device.

The setting unit 20D either can set a single local area size for a single image 30, or can set a plurality of mutually-different local area sizes for a single image 30. In the case of setting a plurality of local area sizes, the user can select two or more estimation result images 48 (estimation results 46) from among a plurality of estimation result images 48 (estimation results 46) included in the output image 54. Then, the setting unit 20D can set the local area sizes that are used in the estimation of the estimation results 46 in the estimation result images 48 received from the input unit 10E via the receiving unit 20F.

Alternatively, the setting unit 20D can set mutually-different local area sizes in mutually-different areas in the image 30.

Figure 7:
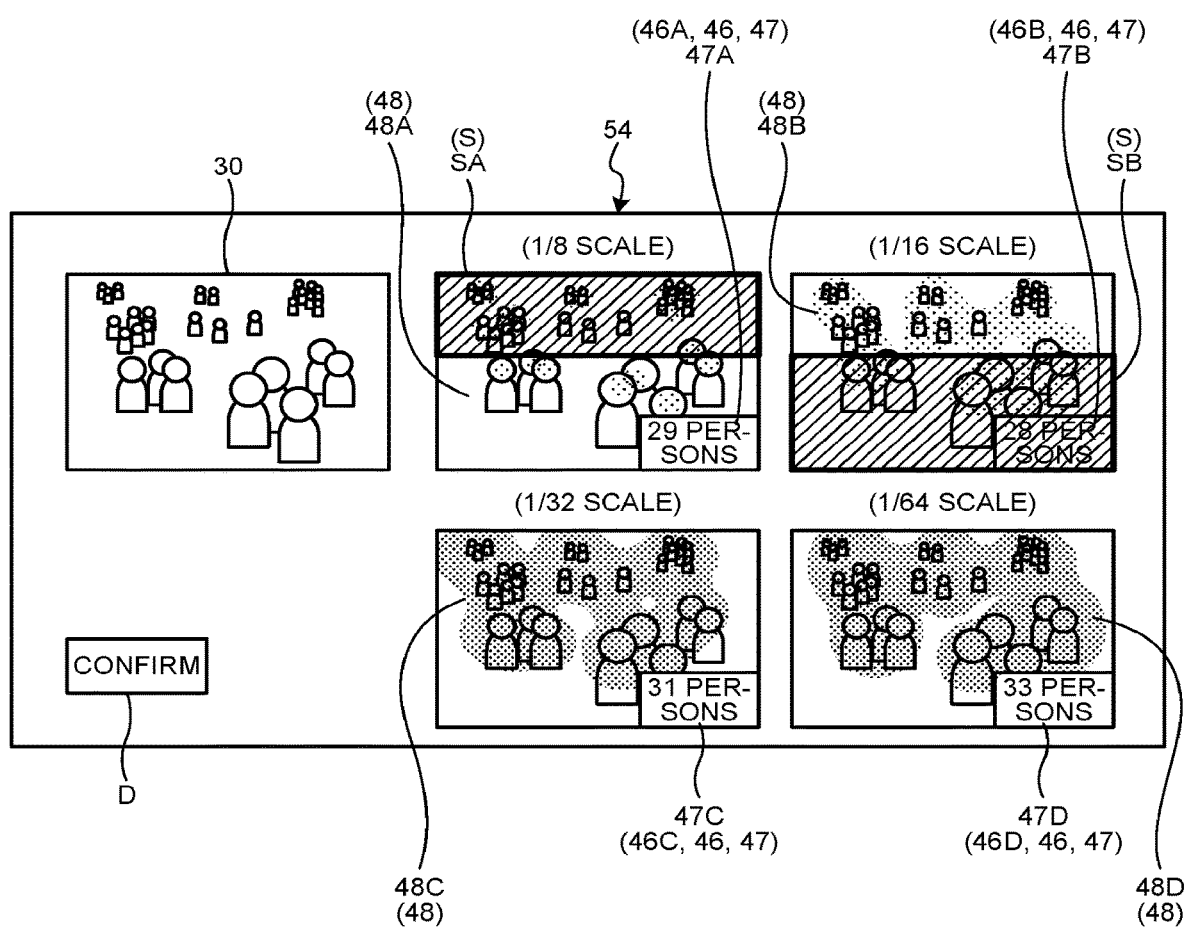
FIG. 7 is a schematic diagram illustrating output images according to the first embodiment.

FIG. 7 is a schematic diagram illustrating an example of the output image 54.

The user operates the input unit 10E while visually confirming the displayed output image 54, and selects a plurality of estimation result images 48 (estimation results 46) having mutually different local area sizes. At that time, the user selects specific areas in the estimation result images 48 by operating the input unit 10E.

In FIG. 7, as an example, it is illustrated that, an upper area SA with reference to FIG. 7 is selected in the estimation result image 48A corresponding to the local area size of 8×8 pixels, and a lower area SB with reference to FIG. 7 is selected in the estimation result image 48B corresponding to the local area size of 16×16 pixels.

In the above case, with regard to the area SA in the image 30, the setting unit 20D sets the local area size of 8×8 pixels that is used in deriving the estimation result 46A in the estimation result image 48A. Similarly, with regard to the area SB in the image 30, the setting unit 20D sets the local area size of 16×16 pixels that is used in deriving the estimation result 46B in the estimation result image 48B.

Returning to the explanation with reference to FIG. 1, the estimating unit 20G rebuilds the reference learning model 50 into the learning model 52 that is used for deriving the estimation result 46 of the local area 40 having the local area size set by the setting unit 20D.

Figure 8:
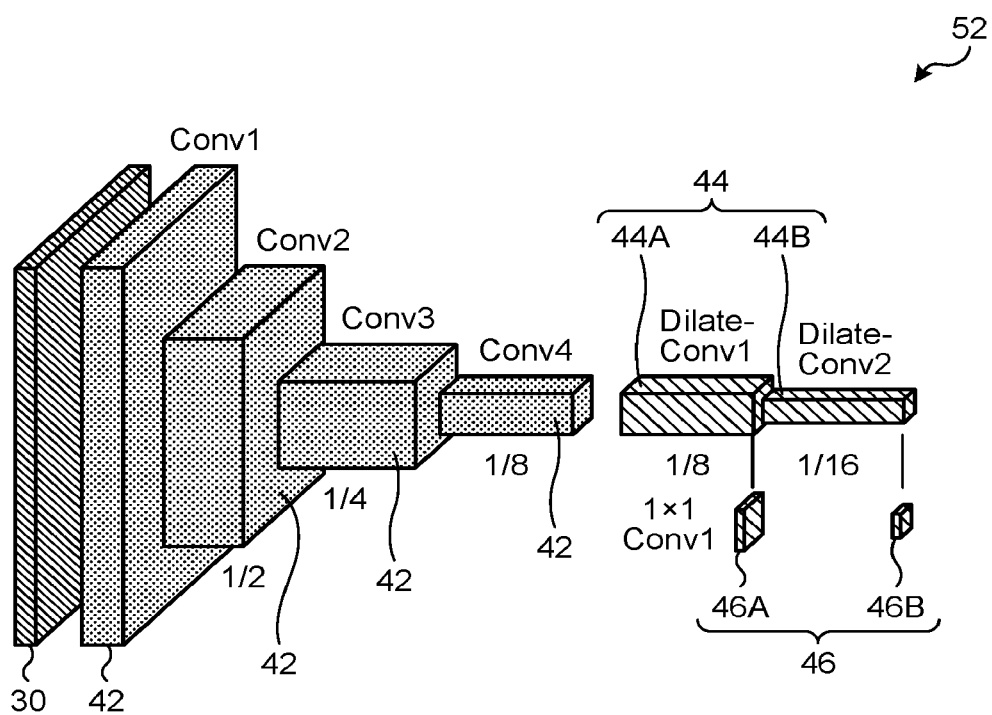
FIG. 8 is a schematic diagram illustrating a learning model according to the first embodiment.

FIG. 8 is a schematic diagram illustrating an example of the learning model 52 that is obtained as a result of rebuilding. For example, it is assumed that the setting unit 20D sets the local area size of 16×16 pixels. In this case, the estimating unit 20G repeatedly performs a convolution operation to reduce the image 30 into the feature map 44B having $\frac{1}{16}$-th of the size, and rebuilds the reference learning model 50 illustrated in FIG. 3 into the learning model 52 that outputs the estimation result 46B.

More specifically, the estimating unit 20G rebuilds the network of the learning model 52 by deleting, from the learning model 52, the feature maps 44 and the estimation results 46 that are formed as a result of the convolution operation performed in the latter part (bottom part) of the set local area size. By this operation, the estimating unit 20G rebuilds the learning model 52 from the reference learning model 50.

Then, the estimating unit 20G stores, in the memory unit 20B, the post-rebuilding learning model 52 in association with identification information that enables unique identification of the scope of the target area of the image 30 which was used in rebuilding the learning model 52. As the identification information, it is possible to use identification information of the photographing unit 10B that captured the concerned image 30.

When the obtaining unit 20C obtains a new image 30, for each local area 40 having the local area size set based on the new image 30, the estimating unit 20G estimates the object count in that image 30.

Specifically, the estimating unit 20G reads, from the memory unit 20B, the learning model 52 corresponding to the identification information of the scope of the target area of the image 30 obtained by the obtaining unit 20C. Then, the estimating unit 20G estimates the object count in the concerned image 30 by using the learning model 52. As described above, the learning model 52 is obtained by rebuilding the reference learning model 50 based on the local area size set in the concerned image 30. Hence, the estimating unit 20G inputs the image 30 in the readout learning model 52, and obtains the estimation result 46 representing the object count in each local area 40 having the local area size set in the image 30. Then, the estimating unit 20G performs the estimation operation with respect to the entire image 30 while varying the position of the local area 40 in the image 30.

The estimating unit 20G can further perform the operation of either displaying the estimation results 46 on the display 10D, or storing the estimation results 46 in the memory unit 20B, or sending the estimation results 46 to an external device via the communicating unit 10A.

Meanwhile, as described earlier, there are cases where a plurality of local area sizes is set with respect to a single image 30. In this case, the estimating unit 20G stores, in the memory unit 20B in association with identification information enabling unique identification of the scope of the target area in the image 30, a plurality of learning models 52 each of which is rebuilt corresponding to one of the local area sizes. Hence, in this case, the estimating unit 20G reads, from the memory unit 20B, a plurality of learning models 52 corresponding to the identification information of the scope of target area in the image 30 that is newly obtained by the obtaining unit 20C.

In this case, the estimating unit 20G inputs the image 30 in each of the readout learning models 52 and obtains a plurality of estimation results 46 as the output from the learning models 52. Then, the estimating unit 20G can use the weighted sum of the estimation results 46 as the estimation result 46 of each local area 40 of the image 30.

More specifically, for each local area 40, the estimating unit 20G can multiply a predetermined weight coefficient to each estimation result 46 corresponding to the concerned local area 40 derived from the learning models 52, and can use the weighted sum representing the sum of the multiplication results as the estimation result 46 of the concerned local area 40. The weighed coefficient can be set in advance for each local area size, and can be stored in advance in the image 30B. Then, the estimating unit 20G can perform the estimation operation with respect to the entire image 30 while varying the position of the local area 40 in the image 30, and can estimate the count of objects appearing in the image 30.

As described earlier, there are cases where the setting unit 20D sets local area sizes of mutually different sizes in mutually different areas in the image 30 (see FIG. 7). In this case, the setting unit 20D can store, in the memory unit 20B in association with identification information enabling unique identification of the scope of the target area in the image 30, area information that represents the position and the scope in the image 30; and the learning model 52 that is rebuilt based on the local area size set in the area represented by the area information.

Then, for each area in the image 30, the estimating unit 20G can use the learning model 52 corresponding to the local area size set in the concerned area and can obtain the estimation result 46 representing the object count in each local area 40. Subsequently, the estimating unit 20G can perform the estimation operation with respect to the entire image while varying the position of the local area 40 in the image 30, and can estimate the count of objects appearing in the image 30.

Figure 9:
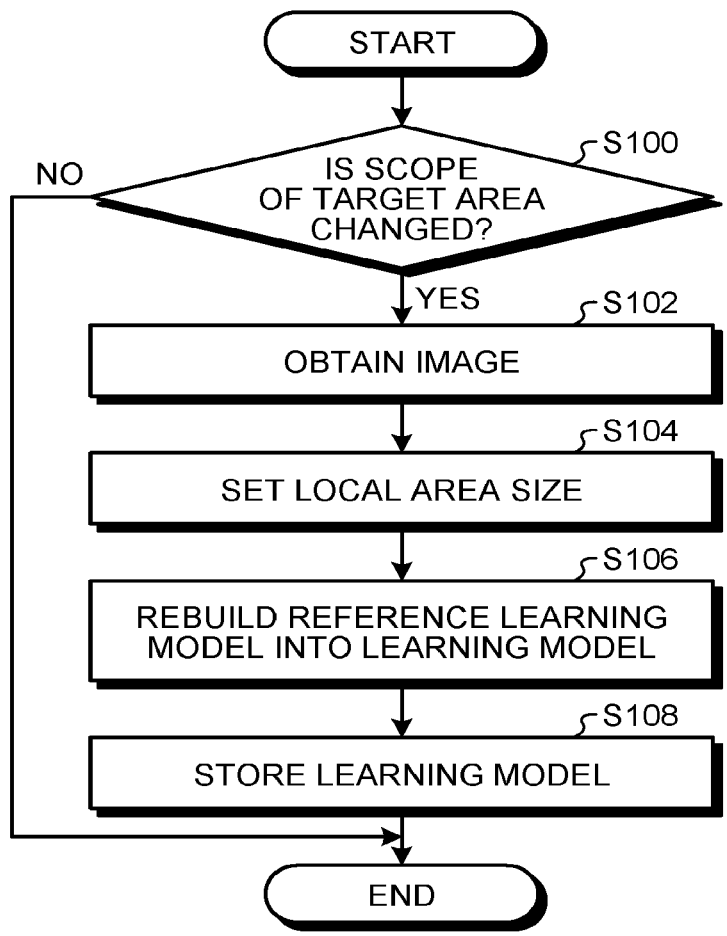
FIG. 9 is a flowchart for explaining an object count estimation operation according to the first embodiment.
Figure 10:
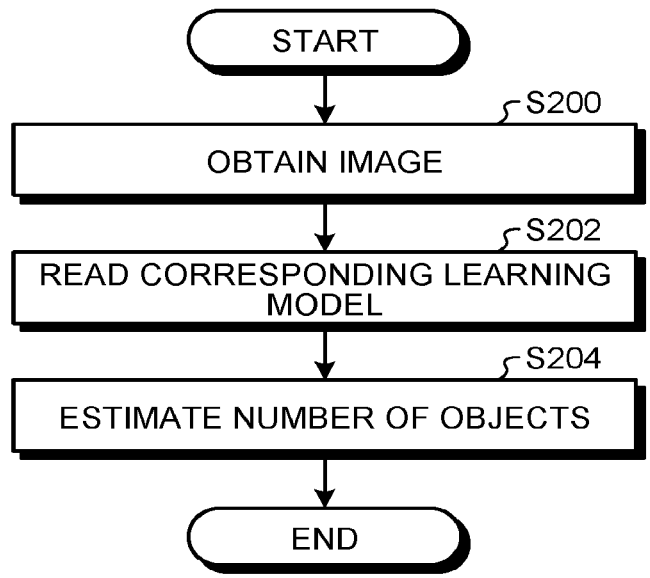
FIG. 10 is a flowchart for explaining an object count estimation operation according to the first embodiment.

Given below is the explanation of an exemplary flow of an object count estimation operation performed in the object count estimation apparatus 20 according to the first embodiment. FIGS. 9 and 10 are flowcharts for explaining an example of the object count estimation operation.

FIG. 9 is a flowchart for explaining an example of generating the learning model 52 during the object count estimation operation.

The processing unit 20A determines whether or not the scope of the target area has been changed (Step S100).

In the case in which a captured image is used as the target image 30 for object count estimation, a change in the scope of the target area refers to a change in at least one of the following factors of either the photographing unit 10B that captures the image 30 or some other photographing device that captures the image 30: new installation or a change in installation of the photographing unit 10B or the other photographing device; the photographing conditions; the height of the installation position from the ground, the photographing angle, the photographing environment (such as brightness), the angle of view, and the resolution. Alternatively, when the image 30 other than a captured image is used as the target image 30 for object count estimation, a change in the scope of the target area represents a case in which the size of the objects appearing in the image 30 has been changed or a case in which a new image 30 is obtained. At Step S100, when change information representing a change is input as an instruction by the user from the input unit 10E, the processing unit 20A can determine that the scope of the target area has been changed.

When it is determined that the scope of the target area is not changed (No at Step S100), the present routine is ended. On the other hand, when it is determined that the scope of the target area has been changed (Yes at Step S100), the system control proceeds to Step S102.

At Step S102, the obtaining unit 20C obtains the image 30 in which the scope of the target area has been changed as determined at Step S100 (Step S102).

Based on the image 30 obtained at Step S102, the setting unit 20D sets the local area size representing a unit of object count estimation in the image 30 (Step S104).

Next, the estimating unit 20G rebuilds the reference learning model 50, which is stored in the memory unit 20B, into the learning model 52 that is for deriving the estimation result 46 for the local area 40 having the local area size set at Step S104 (Step S106). Then, the estimating unit 20G stores, in the memory unit 20B, the learning model 52, which is obtained as a result of rebuilding at Step S106, in association with identification information enabling unique identification of the scope of the target area of the image 30 obtained at Step S102 (Step S108). Then, the present routine is ended.

FIG. 10 is a flowchart for explaining an exemplary flow of object count estimation performed during the object count estimation operation.

The obtaining unit 20C obtains the image 30 (Step S200). The setting unit 20D reads, from the memory unit 20B, the learning model 52 that corresponds to the identification information enabling unique identification of the scope of the target area in the image 30 obtained at Step S200 (Step S202).

For example, the setting unit 20D can identify the scope of the target area of the image 30 by analyzing the obtained image 30 with a known image analysis method. Since the identification information contains information representing the identified scope of the target area, it is possible to use the identification information. Alternatively, the image 30 can be configured to include information representing the identification information or information representing the scope of the target area of the image 30. In this case, such information can be included in the header portion of the image 30. Then, at the transmission side of the image 30 (for example, the photographing unit 10B), when transmitting the image 30 to the object count estimation apparatus 20, the image 30 having the concerned information assigned thereto can be sent. In this case, the setting unit 20D can read, from the memory unit 20B, the learning model 52 corresponding to the identification information included in the image 30.

Subsequently, the estimating unit 20G estimates, for each local area 40 having the local area size set in the image 30, the count of objects appearing in the image 30 by inputting the image 30, which has been obtained at Step S200, to the learning model 52 read at Step S202 (Step S204). Then, the present routine is ended.

In the operation performed at Step S202, there are cases where the learning model 52 corresponding to the identification information, which enables unique identification of the scope of the target area in the image 30 obtained at Step S200, is not stored in the memory unit 20B. In this case, when it is determined at Step S100 illustrated in FIG. 9 that, the scope of the target area has been changed (Yes at Step S100), the operations from Step S104 to Step S108 can be performed with respect to the image 30. That can be followed by the operations at Step S202 to Step S204.

As described above, the object count estimation apparatus 20 according to the first embodiment includes the obtaining unit 20C, the setting unit 20D, and the estimating unit 20G. The obtaining unit 20C obtains the image 30. The setting unit 20D sets, based on the image 30, the local area size representing a unit of object count estimation in the image 30. For each local area 40 having the set local area size, the estimating unit 20G estimates the count of objects appearing in the image 30.

Accordingly, in the object count estimation apparatus 20 according to the first embodiment, the local area size representing a unit of object count estimation in the image is set based on this image 30.

To be more specific, in the object count estimation apparatus 20 according to the first embodiment, even when the sizes of the persons 32 captured in the image 30 change as a result of changing the scope of the target area of the image 30, the local area size is set based on the image 30. Then, in the object count estimation apparatus 20, for each local area size that is set, the count of objects appearing in the image 30 can be estimated.

Therefore, the object count estimation apparatus 20 according to the first embodiment is capable of estimating the object count with high accuracy.

The reference learning model 50 and the learning model 52 can be configured to output the estimation result 46 that includes, in addition to including the count of persons 32, at least either the positions or the density of the persons 32 in the image 30. In this case, in addition to achieving the effect described above, the object count estimation apparatus 20 according to the first embodiment is also capable of estimating, with high accuracy, at least either the density of the persons 32 captured in the image 30 or the positions of the persons 32 captured in the image 30.

Second Embodiment

In a second embodiment, the explanation is given for a case in which a learning model that is learnt using specific teacher data is used as the reference learning model 50.

Herein, the identical functions and the identical configuration to the first embodiment are referred to by the same reference numerals, and the detailed explanation is omitted.

Figure 11:
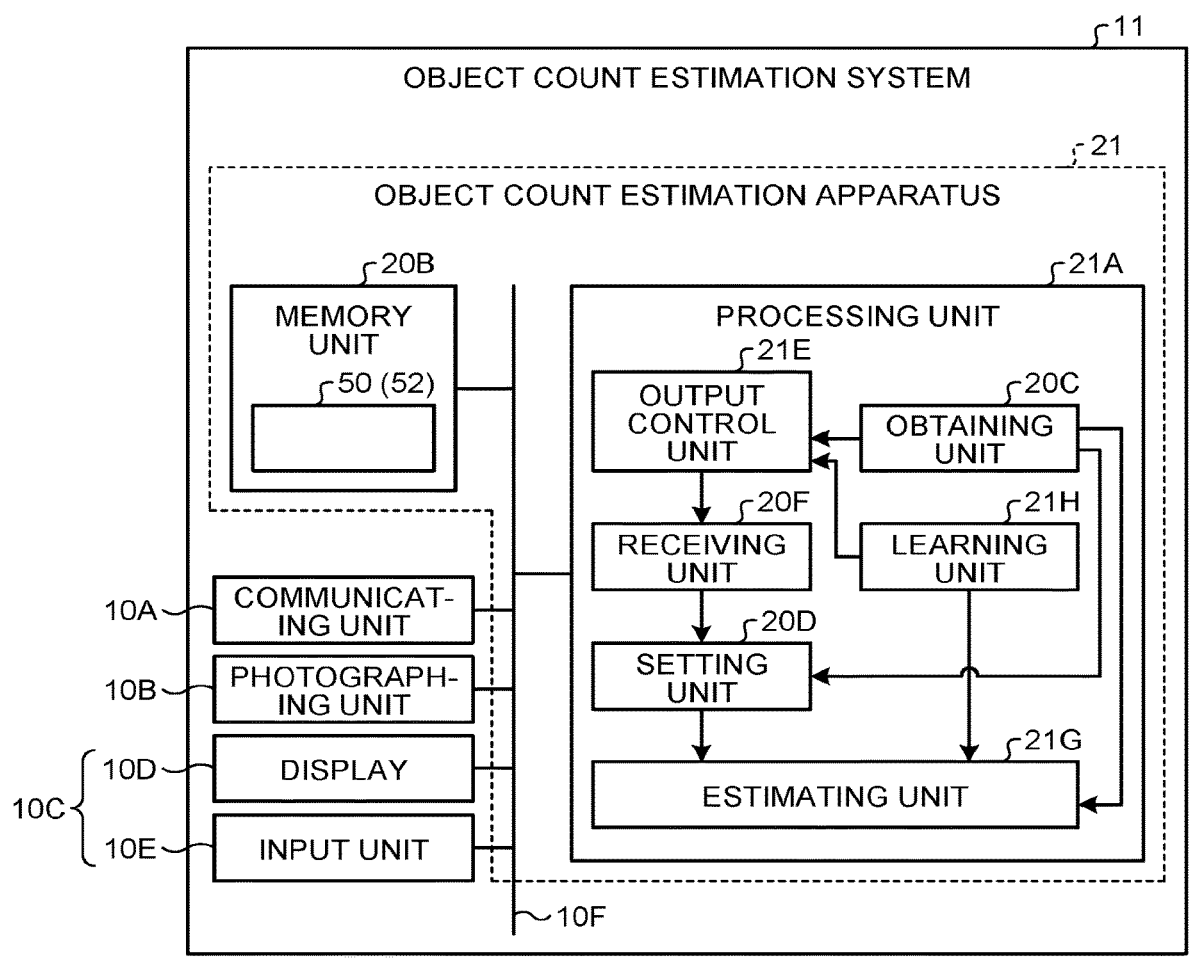
FIG. 11 is a schematic diagram illustrating an object count estimation system according to a second embodiment.

FIG. 11 is a schematic diagram illustrating an example of an object count estimation system 11 according to the second embodiment.

The object count estimation system 11 includes an object count estimation apparatus 21, the communicating unit 10A, the photographing unit 10B, and the UI unit 10C. The object count estimation apparatus 21 is connected to the communicating unit 10A, the photographing unit 10B, and the UI unit 10C in a manner enabling transmission and reception of data and signals.

The object count estimation apparatus 21 includes the memory unit 20B and a processing unit 21A. Thus, except for including the processing unit 21A in place of the processing unit 20A, the object count estimation apparatus 21 is the same as the object count estimation apparatus 20 according to the first embodiment.

The processing unit 21A includes the obtaining unit 20C, the setting unit 20D, an output control unit 21E, the receiving unit 20F, an estimating unit 21G, and a learning unit 21H.

The learning unit 21H learns the reference learning model 50. The learning unit 21H learns the reference learning model 50, which is for deriving the estimation result 46 from the teacher image, by using teacher data that representing the correspondence between a teacher image and the object count estimated from each reduced image obtained by reducing the teacher image to have one of a plurality of mutually-different local area sizes.

Figure 12:
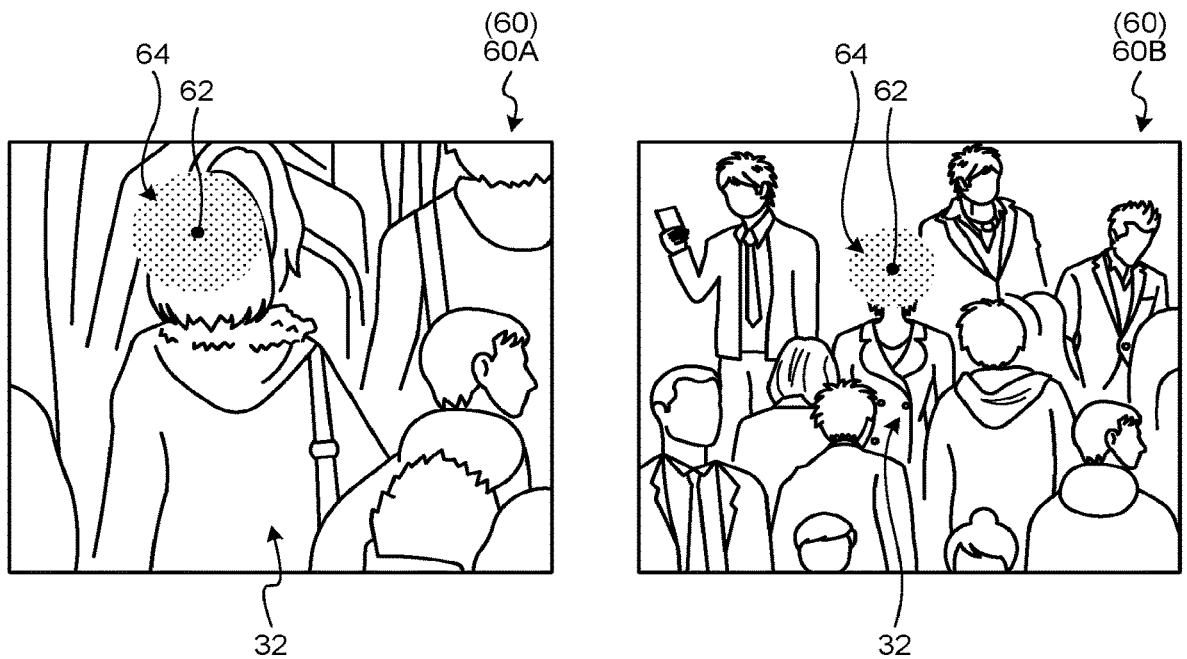
FIG. 12 is a schematic diagram illustrating teacher images according to the second embodiment.

The teacher image includes position information of objects and distribution information representing the existence probability distribution of objects. FIG. 12 is a schematic diagram illustrating examples of a teacher image 60. In FIG. 12, teacher images 60A and 60B are illustrated as the teacher images 60.

As shown in FIG. 12, the teacher image 60 includes position information 62 and distribution information 64 of a person 32. The position information 62 represents the position of the concerned person 32 in the image 30, who appears in the teacher image 60. The distribution information 64 represents the existence probability distribution of the concerned person 32. In FIG. 12, an example is illustrated, in which the distribution information 64 is expressed with the Gaussian distribution. Moreover, in FIG. 12, an example is illustrated in which, the distribution information 64 expressed with the Gaussian distribution represents the existence probability of the head region representing an example of the body region used in the identification of the person 32.

The learning unit 21H stores in advance, in the memory unit 20B, teacher data representing the correspondence between the teacher image 60 and the object count estimated from each reduced image obtained by reducing the teacher image 60 to have one of a plurality of mutually-different local area sizes. Herein, the reduced images in the distribution information 64 corresponding to the teacher image 60 are images having been reduced in such a way that the sum of the post-reduction pixels does not change from the sum of the pre-reduction pixels.

Then, the learning unit 21H uses the teacher data and learns the reference learning model 50 based on a known learning method (see FIG. 3).

The output control unit 21E and the estimating unit 21G can perform identical operations to the first embodiment, except for using the reference learning model 50 that is learnt by the learning unit 21H.

Specifically, the estimating unit 21G can rebuild the reference learning model 50, which is obtained as a result of learning performed by the learning unit 21H, into the learning model 52. Then, the estimating unit 21G can estimate the count of objects appearing in the image 30 by using the post-rebuilding learning model 52 and the image 30.

As illustrated in FIG. 12, the teacher image 60 includes the distribution information 64 that represents the existence probability distribution of the concerned person 32. More particularly, the concerned person 32 appearing in the teacher image 60 is blurred due to uniform Gaussian distribution. For that reason, the distribution information 64, which is in the blurred state due to the Gaussian distribution, differs from the actual image of the teacher image 60. That difference is believed to negatively affect the reference learning model 50.

Considering above, in the second embodiment, the object count estimation apparatus 21 estimates, for each local area 40 having the local area size set based on the image 30, the count of persons 32 captured in the image 30. Hence, by performing the learning using the distribution information 64 subjected to reduction, the object count estimation apparatus 21 according to the second embodiment becomes less likely to be affected by the blurring. As a result, in addition to the effects achieved by the first embodiment, the object count estimation apparatus 21 according to the second embodiment is capable of learning the reference learning model 50 having high accuracy and rebuilding the learning model 52 having high accuracy.

Given below is the explanation of an exemplary hardware configuration of the object count estimation apparatuses 20 and 21 according to the first and second embodiments described above.

Figure 13:
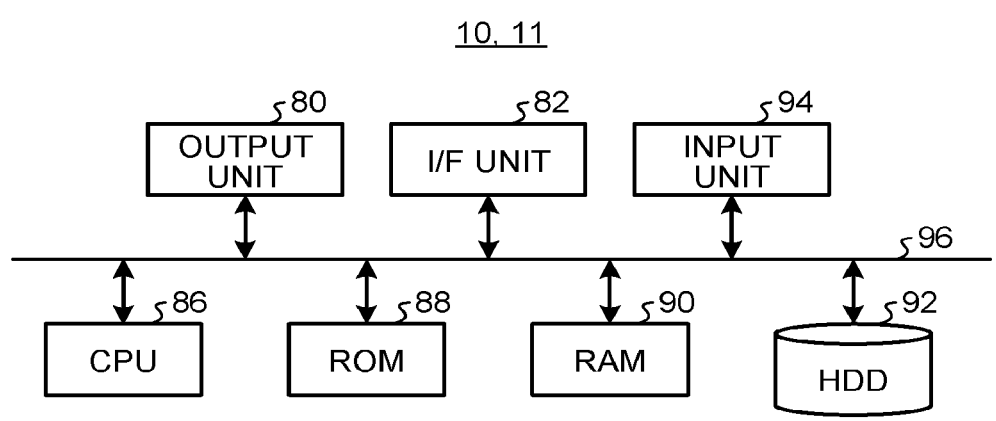
FIG. 13 is an exemplary hardware configuration diagram according to the first and second embodiments.

FIG. 13 is an exemplary hardware configuration diagram of the object count estimation apparatuses 20 and 21 according to the embodiments described above.

The object count estimation apparatuses 20 and 21 according to the embodiments described above have the hardware configuration of a commonly-used computer that includes: a control device such as a CPU 86; memory devices such as a read only memory (ROM) 88, a random access memory (RAM) 90, and a hard disk drive (HDD) 92; an I/F unit 82 that represents the interface with various devices; an output unit 80 that outputs a variety of information such as output information; an input unit 94 that receives user operations; and a bus 96 that connects the other constituent elements to each other.

In the object count estimation apparatuses 20 and 21 according to the embodiments described above, the above-mentioned constituent elements are implemented in the computer by that the CPU 86 reads computer programs from the ROM 88 into the RAM 90.

The computer programs for executing the various operations implemented in the object count estimation apparatuses 20 and 21 according to the embodiments described above can be stored in the HDD 92. Alternatively, the computer programs for executing the various operations implemented in the object count estimation apparatuses 20 and 21 according to the embodiments described above can be programed on the ROM 88 in advance.

Still alternatively, the computer programs for executing the various operations implemented in the object count estimation apparatuses 20 and 21 according to the embodiments described above can be stored as installable files or executable files in a computer-readable storage medium such as a compact disk read only memory (CD-ROM), a compact disk recordable (CD-R), a digital versatile disk (DVD), or a flexible disk (FD); and can be provided as a computer program product. Still alternatively, the computer programs for executing the various operations implemented in the object count estimation apparatuses 20 and 21 according to the embodiments described above can be stored in a downloadable manner in a computer connected to a network such as the Internet. Still alternatively, the computer programs for executing the various operations implemented in the object count estimation apparatuses 20 and 21 according to the embodiments described above can be distributed over a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object count estimation apparatus comprising:
   a memory; and
   one or more hardware processors coupled to the memory and configured to:
      obtain an image;
      set, based on the image, a local area size representing a unit of object count estimation in the image; and
      estimate an object count in the image for each local area having the set local area size, wherein
   the one or more hardware processors carry out the estimation of the object count by using:
      a learning model for deriving an estimation result of an object count in an area having the local area size in the image by repeatedly performing a convolution operation on the image,
      the image, and
      the set local area size; and
   the one or more hardware processors:
      rebuild a reference learning model into the learning model for deriving the estimation result of a local area having the set local area size, the reference learning model being for deriving, from the image, the estimation result of each of local areas having a plurality of the local area sizes different from each other by repeatedly performing a convolution operation on the image, and
      carry out the estimation of the object count in the image by using the post-rebuilding learning model and the image.

2. The apparatus according to claim 1, wherein the one or more hardware processors:
   learn the reference learning model for deriving the estimation result from a teacher image by using teacher data representing correspondence between
      the teacher image including position information of objects and distribution information representing existence probability distribution of objects, and
      an object count estimated from each reduced image obtained by reducing the teacher image to have one of a plurality of the local area sizes different from each other;
   rebuild the reference learning model into the learning model for deriving the estimation result estimated from the reduced images having the set local area size; and
   carry out the estimation of the object count in the image by using the post-rebuilding learning model and the image.

3. The apparatus according to claim 1, wherein the one or more hardware processors:
   output an output image including a list of the estimation results obtained by estimating an object count in the image for each local area having one of a plurality of the local area sizes different from each other;
   receive a user selection on the estimation result included in the output image; and
   carry out the setting of the local area size based on the received estimation result.

4. The apparatus according to claim 1, wherein the one or more hardware processors carry out the setting of the local area size by setting a local area size that corresponds to an estimation result closest to a correct object count in the image obtained in advance from among the estimation results obtained by estimating an object count in the image for each of local areas having a plurality of the local area sizes different from each other.

5. The apparatus according to claim 1, wherein the one or more hardware processors:
   set a plurality of the local area sizes different from each other; and
   estimate, as the estimation result, a weighted sum of object counts of areas having the set local area sizes in the image, the object counts being estimated for each set local area size.

6. The apparatus according to claim 1, wherein the one or more hardware processors:
   set the local area sizes different from each other in mutually-different areas in the image; and
   estimate, for each of the mutually-different areas in the image, an object count in each local area having the local area size set for the corresponding area.

7. An object count estimation method implemented by a computer, the method comprising:
   obtaining an image;
   setting, based on the image, a local area size representing a unit of object count estimation in the image; and
   estimating an object count in the image for each local area having the set local area size, wherein
   the estimating of the object count is carried out by using:
      a learning model for deriving an estimation result of an object count in an area having the local area size in the image by repeatedly performing a convolution operation on the image,
      the image, and
      the set local area size; and
   the method further comprises:
      rebuilding a reference learning model into the learning model for deriving the estimation result of a local area having the set local area size, the reference learning model being for deriving, from the image, the estimation result of each of local areas having a plurality of the local area sizes different from each other by repeatedly performing a convolution operation on the image, and
      carrying out the estimation of the object count in the image by using the post-rebuilding learning model and the image.

8. A computer program product comprising a non-transitory computer-readable recording medium on which an executable program is recorded, the program instructing a computer to:
   obtain an image;
   set, based on the image, a local area size representing a unit of object count estimation in the image; and
   estimate an object count in the image for each local area having the set local area size, wherein
   estimation of the object count is carried out by using:
      a learning model for deriving an estimation result of an object count in an area having the local area size in the image by repeatedly performing a convolution operation on the image,
      the image, and
      the set local area size; and
   the program further instructs the computer to:
      rebuild a reference learning model into the learning model for deriving the estimation result of a local area having the set local area size, the reference learning model being for deriving, from the image, the estimation result of each of local areas having a plurality of the local area sizes different from each other by repeatedly performing a convolution operation on the image, and
      carry out the estimation of the object count the image by using the post-rebuilding learning model and the image.

* * * * *